(12) United States Patent
Chiang

(10) Patent No.: US 6,445,709 B1
(45) Date of Patent: Sep. 3, 2002

(54) METHOD AND APPARATUS FOR FINDING A MATCH ENTRY USING RECEIVE PORT NUMBER EMBEDDED IN THE PORT VECTOR

(75) Inventor: John M. Chiang, San Jose, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/311,367

(22) Filed: May 13, 1999

(51) Int. Cl.[7] .......................... H04L 12/56; G06F 13/00
(52) U.S. Cl. ...................... 370/399; 709/236; 706/12
(58) Field of Search .................... 709/236; 370/397, 370/399; 706/12, 25

(56) References Cited

U.S. PATENT DOCUMENTS

| | | | | |
|---|---|---|---|---|
| 5,852,607 A | * | 12/1998 | Chin | 370/401 |
| 5,892,912 A | * | 4/1999 | Suzuki et al. | 370/395.53 |
| 6,104,696 A | * | 8/2000 | Kadambi et al. | 370/218 |
| 6,111,874 A | * | 8/2000 | Kerstein | 370/389 |
| 6,128,296 A | * | 10/2000 | Daruwalla et al. | 370/389 |
| 6,151,297 A | * | 11/2000 | Congdon et al. | 370/216 |
| 6,154,446 A | * | 11/2000 | Kadambi et al. | 370/239 |
| 6,161,144 A | * | 12/2000 | Michels et al. | 709/238 |
| 6,236,654 B1 | * | 5/2001 | Egbert | 370/392 |
| 6,243,394 B1 | * | 6/2001 | Deng | 370/466 |
| 6,266,705 B1 | * | 7/2001 | Ullum et al. | 709/238 |
| 6,335,935 B2 | * | 1/2002 | Kadambi et al. | 370/396 |
| 6,356,551 B1 | * | 3/2002 | Egbert | 370/389 |
| 2001/0012294 A1 | * | 8/2001 | Kadambi et al. | 370/391 |
| 2001/0043611 A1 | * | 11/2001 | Kadambi et al. | 370/429 |

* cited by examiner

*Primary Examiner*—Kenneth R. Coulter

(57) ABSTRACT

A network switch configured for switching data packets across multiple ports uses an address table to generated frame forwarding information. The switch receives frame information including a source address and destination address along with a virtual local area network (VLAN) ID, if applicable. A decision-making engine searches a network address table to "learn" Medium Access Control (MAC) addresses without having to store receive port numbers by embedding the receive port number in the stored port vector fields.

15 Claims, 12 Drawing Sheets

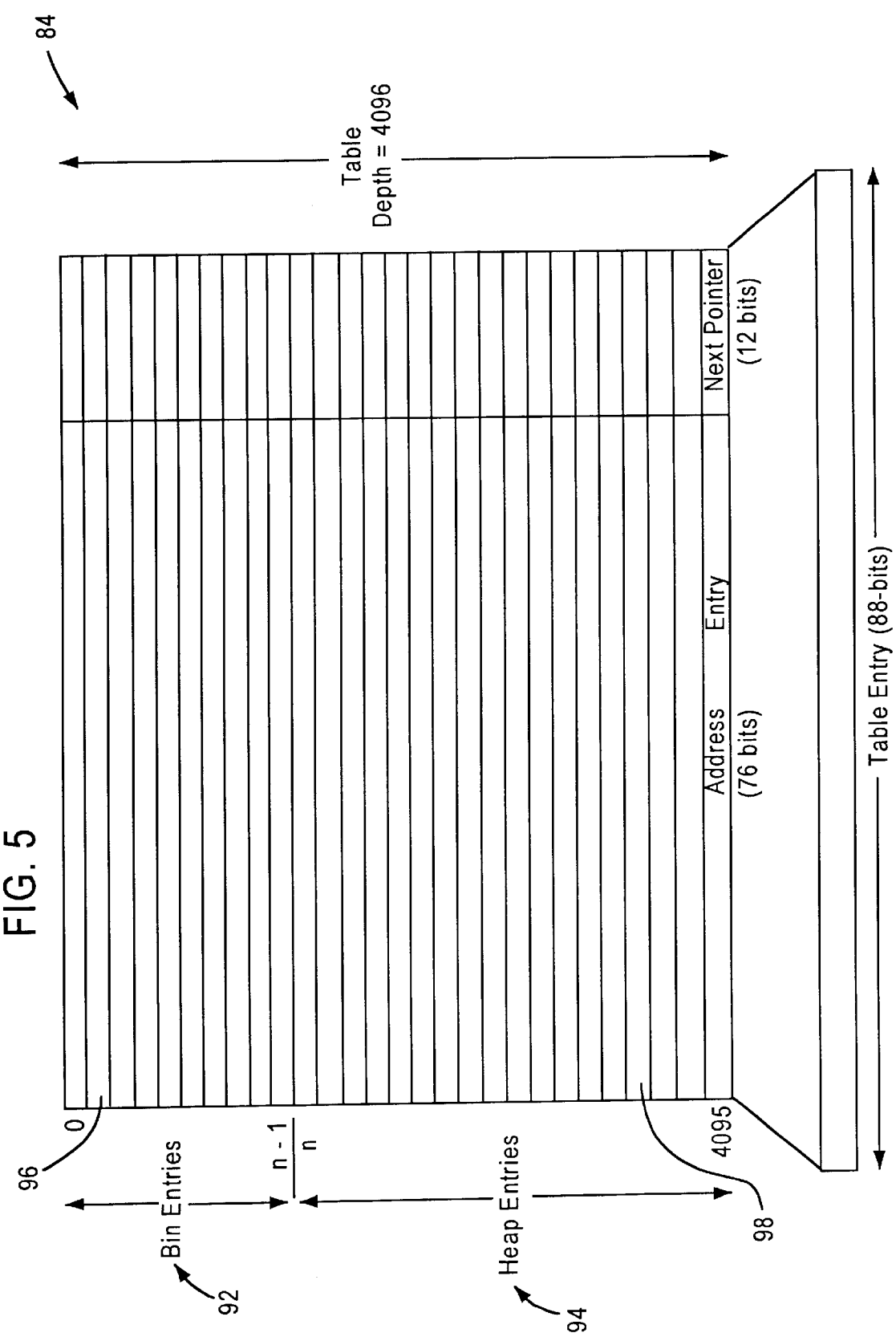

METHOD AND APPARATUS FOR FINDING A MATCH ENTRY USING RECEIVE PORT NUMBER EMBEDDED IN THE PORT VECTOR

BACKGROUND OF THE INVENTION

1. Technical Field

The present invention relates to data communication networking devices, more particularly, to data network switches capable of performing frame forwarding decisions using an efficient address table.

2. Background Art

In computer networks, a plurality of network stations are interconnected via a communications medium. For example, Ethernet is a commonly used local area network scheme in which multiple stations are connected to a single shared serial data path. These stations often communicate with a switch located between the shared data path and the stations connected to that path. Typically, the switch controls the communication of data packets on the network.

When all of the stations connected to the network are simultaneously operating, packet traffic on the shared serial path can be heavy with little time between packets. In addition, data received by the switch may include data that is being transmitted to a single station (unicast), data that is being transmitted to multiple stations (multicast) or data that is being transmitted to all the stations (broadcast). In order for the data to be properly and efficiently transmitted, the switch must make data forwarding decisions by searching an address table in a short amount of time. The address search is performed for many data packets received from many sources, resulting in the storage of a variety of information associated with source addresses. This dictates increasing the size of the address table, which stores these addresses along with other relevant information.

A key function in the proper forwarding of the frames is "learning" the source addresses (SA) of these frames. This learning process necessitates adding or overwriting the table entries of the network address table. Typically, the address table is stored within an integrated circuit (IC) chip, which implements the frame forwarding logic. Because the size of the table is dictated by the number of fields, a reduction in the number of fields translates into a corresponding reduction in the die size of the IC chip.

SUMMARY OF THE INVENTION

There exists a need for a switching device that employs an address table of minimal size. There is also a need to minimize the die size of the switch.

These and other needs are met by the present invention, where data received by the network switch is routed to an internal decision making engine that includes an address table that stores address information. The network switch receives data frames that have in their frame header source and destination addresses. The internal decision making engine learns source addresses by employing a source address (SA) lookup routine that makes use of the address table. The address table entries include a port vector field that contains embedded information about the receive port number.

According to one aspect of the invention, a multiport switch is configured for controlling communication of data frames. The multiport switch comprises a plurality of ports for receiving and transmitting the data frames and an address table for storing address information, which includes the source addresses and the port vectors associated with the data frames. An internal decision making engine, which is coupled to the ports, accesses the address table. The internal decision making engine is also configured to learn the source addresses of the data frames and to store the corresponding port vectors. Each of the port vectors indicates, in a learning mode, the port that received the data frame. In a forwarding mode, the port vector indicates which of the ports are to transmit the data frame.

Another aspect of the present invention provides a method for learning source addresses of data frames received by a multiport switch. The method includes receiving a frame header associated with one of the data frames, whereby, the frame header includes a source address. Also, the method includes assigning a virtual local area network (VLAN) identifier to the received data frames. An internal decision making engine learns the source addresses of the data frames by manipulating an address table that has a plurality of table entries and by creating corresponding the port vectors. Each of the port vectors indicates the port that received the data frame.

In yet another aspect of the present invention, a multiport switch is configured for controlling communication of data frames. The multiport switch comprises a plurality of ports for receiving and transmitting the data frames. An internal decision making engine is coupled to the ports and comprises an internal rules checker controller and an address table. The internal rules checker controller is configured to learn the source addresses of the data frames and to store corresponding port vectors. Each of the port vectors indicates, in a learning mode, the port that received the data frame. In a forwarding mode, the port vectors indicate which of the ports are to transmit the data frame. The internal decision making engine also has an address table for storing address information, which includes source addresses and the port vectors.

Additional advantages and novel features of the invention will be set forth in part in the description which follows, and in part may become apparent to those skilled in the art upon examination of the following or may be learned by practice of the invention. The advantages of the invention may be realized and attained by means of the instrumentalities and combinations particularly pointed out in the appended claims.

BRIEF DESCRIPTION OF THE DRAWINGS

FIGS. 3, 3A, 3B, and 3C is a block diagram illustrating in detail the switching subsystem of FIG. 2.

FIG. 5 illustrates the composition of the IRC address table of FIG. 4.

DETAILED DESCRIPTION OF ILLUSTRATIVE EMBODIMENTS

The present invention will be described with the example of a switch operating in a packet switched network, such as an Ethernet (IEEE 802.3) network. It will become apparent, however, that the present invention is also applicable to other packet switched systems, as described in detail below, as well as to other types of systems in general.

Switch Architecture Overview

Figure 1:
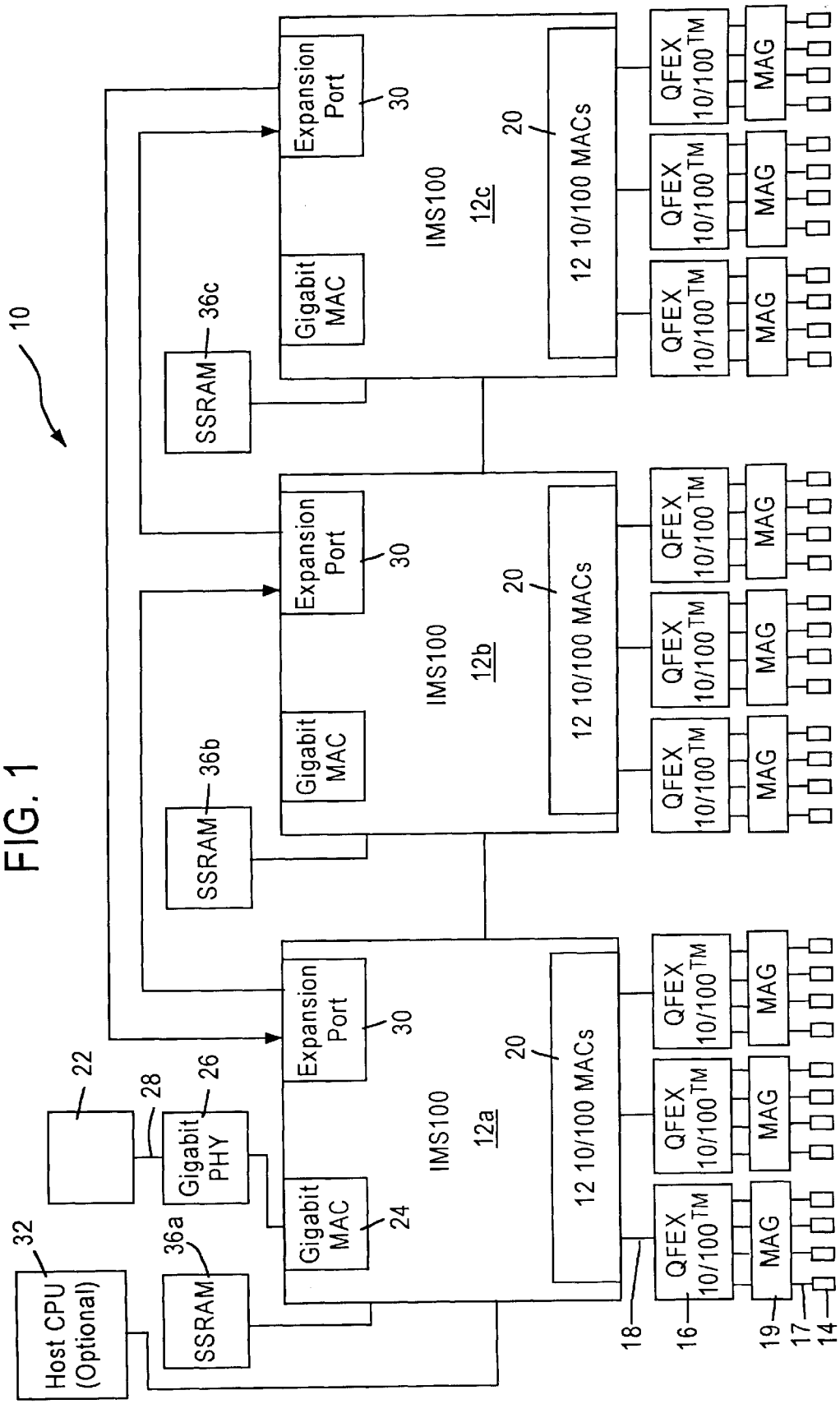
FIG. 1 is a block diagram of a packet switched network including a multiple port switch.

FIG. 1 is a block diagram of an exemplary system in which the present invention may be advantageously employed. The exemplary system 10 is a packet switched network, such as an Ethernet (IEEE 802.3) network. The packet switched network includes integrated multiport switches (IMS) 12 that enable communication of data packets between network stations. The network may include network stations having different configurations, for example twelve (12) 10 megabit per second (Mb/s) or 100 Mb/s network stations 14 (hereinafter 10/100 Mb/s) that send and receive data at a network data rate of 10 Mb/s or 100 Mb/s, and a 1000 Mb/s (i.e., 1 Gb/s) network node 22 that sends and receives data packets at a network speed of 1 Gb/s. The gigabit node 22 may be a server, or a gateway to a high-speed backbone network. Hence, the multiport switches 12 selectively forward data packets received from the network nodes 14 or 22 to the appropriate destination based upon Ethernet protocol.

Each multiport switch 12 includes a media access control (MAC) module 20 that transmits and receives data packets to and from 10/100 Mb/s physical layer (PHY) transceivers 16 via respective reduced media independent interfaces (RMII) 18 according to IEEE 802.3u protocol. Each multiport switch 12 also includes a gigabit MAC 24 for sending and receiving data packets to and from a gigabit PHY 26 for transmission to the gigabit node 22 via a high speed network medium 28.

Each 10/100 Mb/s network station 14 sends and receives data packets to and from the corresponding multiport switch 12 via a media 17 and according to either half-duplex or full duplex Ethernet protocol. The Ethernet protocol ISO/IEC 8802-3 (ANSI/IEEE Std. 802.3, 1993 Ed.) defines a half-duplex media access mechanism that permits all stations 14 to access the network channel with equality. Traffic in a half-duplex environment is not distinguished over the medium 17. Rather, each half-duplex station 14 includes an Ethernet interface card that uses carrier-sense multiple access with collision detection (CSMA/CD) to listen for traffic on the media. The absence of network traffic is detected by sensing deassertion of a receive carrier on the media. Any station 14 having data to send will attempt to access the channel by waiting a predetermined time, known as the interpacket gap interval (IPG), after deassertion of the receive carrier on the media. If a plurality of stations 14 have data to send on the network, each of the stations will attempt to transmit in response to the sensed deassertion of the receive carrier on the media and after the IPG interval, possibly resulting in a collision. Hence, the transmitting station will monitor the media to determine if there has been a collision due to another station sending data at the same time. If a collision is detected, both stations stop, wait a random amount of time, and retry transmission.

The 10/100 Mb/s network stations 14 that operate in full duplex mode send and receive data packets according to the Ethernet standard IEEE 802.3u. The full-duplex environment provides a two-way, point-to-point communication link enabling simultaneous transmission and reception of data packets between each link partner, i.e., the 10/100 Mb/s network station 14 and the corresponding multiport switch 12.

Each multiport switch 12 is coupled to 10/100 physical layer (PHY) transceivers 16 configured for sending and receiving data packets to and from the corresponding multiport switch 12 across a corresponding reduced media independent interface (RMII) 18. In particular, each 10/100 PHY transceiver 16 is configured for sending and receiving data packets between the multiport switch 12 and up to four (4) network stations 14 via the RMII 18. A magnetic transformer 19 provides AC coupling between the PHY transceiver 16 and the corresponding network medium 17. Hence, the RMII 18 operates at a data rate sufficient to enable simultaneous transmission and reception of data packets by each of the network stations 14 to the corresponding PHY transceiver 16.

Each multiport switch 12 also includes an expansion port 30 for transferring data between other switches according to a prescribed protocol. Each expansion port 30 enables multiple multiport switches 12 to be cascaded together as a separate backbone network.

Figure 2:
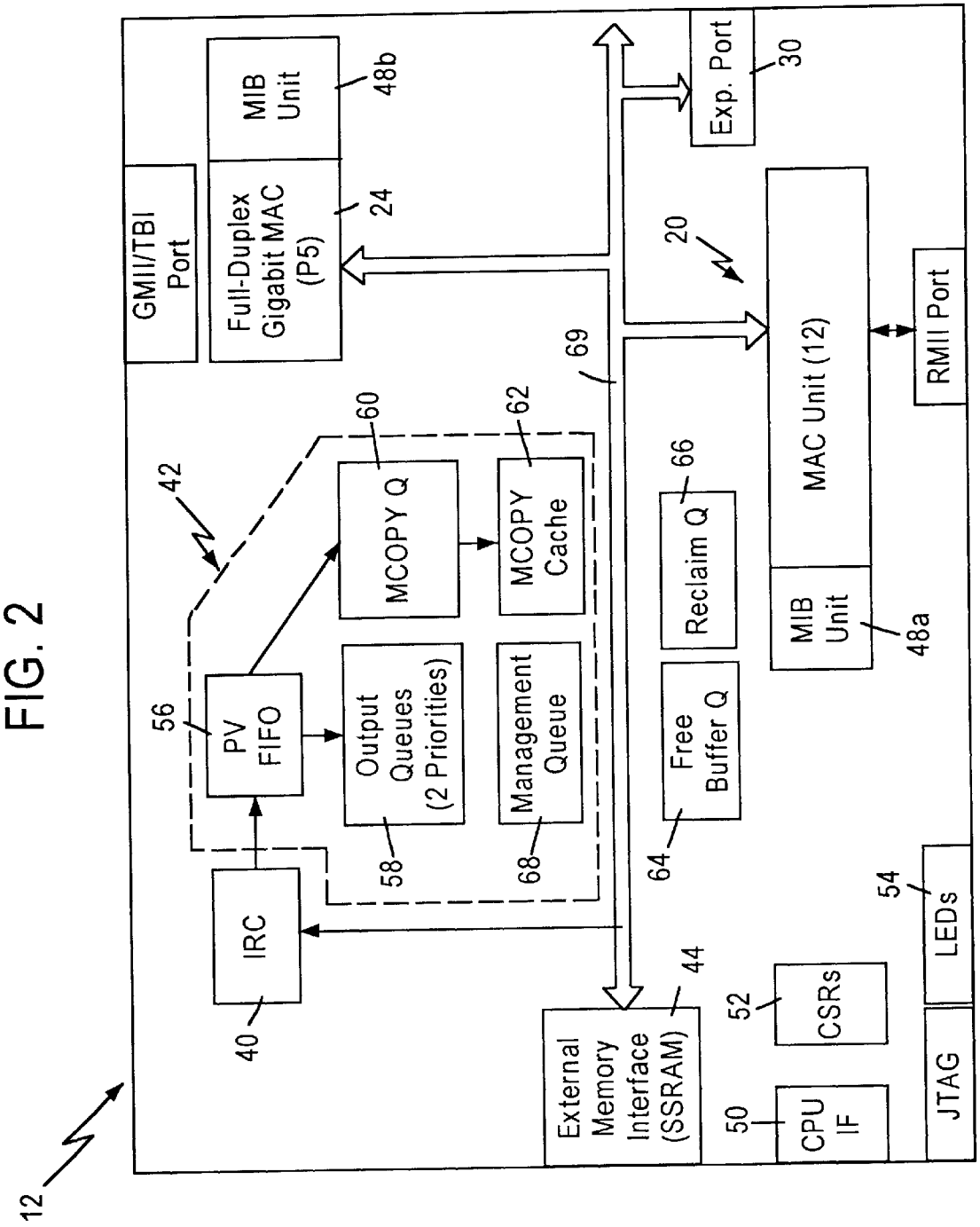
FIG. 2 is a block diagram of the multiple port switch of FIG. 1.

FIG. 2 is a block diagram of the multiport switch 12. The multiport switch 12 contains a decision making engine 40 that performs frame forwarding decisions, a switching subsystem 42 for transferring frame data according to the frame forwarding decisions, an external memory interface 44, management information base (MIB) counters 48a and 48b (collectively 48), and MAC (media access control) protocol interfaces 20 and 24 to support the routing of data packets between the Ethernet (IEEE 802.3) ports serving the network stations 14 and the gigabit node 22. The MIB counters 48 provide statistical network information in the form of management information base (MIB) objects, to an external management entity controlled by a host CPU 32, described below.

The external memory interface 44 enables external storage of packet data in an external memory 36 such as, for example, a synchronous static random access memory (SSRAM), in order to minimize the chip size of the multiport switch 12. In particular, the multiport switch 12 uses the external memory 36 for storage of received frame data and memory structures. The external memory 36 is preferably either a Joint Electron Device Engineering Council (JEDEC) pipelined burst or Zero Bus Turnaround™ (ZBT)-SSRAM having a 64-bit wide data path and a 17-bit wide address path. The external memory 36 is addressable as upper and lower banks of 128K in 64-bit words. The size of the external memory 36 is preferably at least 1 Mbytes, with data transfers possible on every clock cycle through pipelining. Additionally the external memory interface clock operates at clock frequencies of at least 66 MHz, and, preferably, 100 MHz and above.

The multiport switch 12 also includes a processing interface 50 that enables an external management entity such as a host CPU 32 to control overall operations of the multiport switch 12. In particular, the processing interface 50 decodes CPU accesses within a prescribed register access space, and reads and writes configuration and status values to and from configuration and status registers 52.

The internal decision making engine 40, referred to as an internal rules checker (IRC), makes frame forwarding decisions for data packets received.

The multiport switch 12 also includes an LED interface 54 that clocks out the status of conditions per port and drives an external LED logic. The external LED logic drives LED display elements that are human readable.

The switching subsystem 42, configured for implementing the frame forwarding decisions of the IRC 40, includes a port vector first in first out (FIFO) buffer 56, a plurality of output queues 58, a multicopy queue 60, a multicopy cache 62, a free buffer queue 64, and a reclaim queue 66.

The MAC unit 20 includes modules for each port, each module including a MAC receive portion, a receive FIFO buffer, a transmit FIFO buffer, and a MAC transmit portion. Data packets from a network station 14 are received by the corresponding MAC port and stored in the corresponding receive FIFO. The MAC unit 20 obtains a free buffer location (i.e., a frame pointer) from the free buffer queue 64, and outputs the received data packet from the corresponding receive FIFO to the external memory interface 44 for storage in the external memory 36 at the location specified by the frame pointer.

The IRC 40 monitors (i.e., "snoops") the data bus to determine the frame pointer value and the header information of the received packet (including source, destination, and VLAN address information). The IRC 40 uses the header information to determine which MAC ports will output the data frame stored at the location specified by the frame pointer. The decision making engine (i.e., the IRC 40) may thus determine that a given data frame should be output by either a single port, multiple ports, all ports (i.e., broadcast) or no ports (i.e., discarded). For example, each data frame includes a header having source and destination address, where the decision making engine 40 may identify the appropriate output MAC port based upon the destination address. Alternatively, the destination address may correspond to a virtual address that the appropriate decision making engine identifies as corresponding to a plurality of network stations. In addition, the frame may include a VLAN tag header that identifies the frame as information destined to one or more members of a prescribed group of stations. The IRC 40 may also determine that the received data packet should be transferred to another multiport switch 12 via the expansion port 30. Hence, the internal rules checker 40 will decide whether a frame temporarily stored in the external memory 36 should be output to a single MAC port or multiple MAC ports.

The internal rules checker 40 outputs a forwarding decision to the switch subsystem 42 in the form of a forwarding descriptor. The forwarding descriptor includes a priority class identifying whether the frame is high priority or low priority, a port vector identifying each MAC port that should transmit the data frame, receive port number, an untagged set, VLAN information, vector identifying each MAC port that should include VLAN information during transmission, opcode, and frame pointer. The format of the forwarding descriptor will discussed further with respect to FIG. 7. The port vector identifies the MAC ports to receive the data frame for transmission (e.g., 10/100 MAC ports 1–12, Gigabit MAC port, and/or Expansion port). The port vector FIFO 56 decodes the forwarding descriptor including the port vector, and supplies the frame pointer to the appropriate output queues 58 that correspond to the output MAC ports to receive the data frame transmission. In other words, the port vector FIFO 56 supplies the frame pointer on a per-port basis. The output queues 58 give the frame pointer to a dequeuing block 76 (shown in FIG. 3) which fetches the data frame identified in the port vector from the external memory 36 via the external memory interface 44, and supply the retrieved data frame to the appropriate transmit FIFO of the identified ports. If a data frame is to be supplied to a management agent, the frame pointer is also supplied to a management queue 68, which can be processed by the host CPU 32 via the CPU interface 50.

The multicopy queue 60 and the multicopy cache 62 keep track of the number of copies of the data frame that are transmitted from the respective ports, ensuring that the data frame is not overwritten in the external memory 36 until the appropriate number of copies of the data frame have been output from the external memory 36. Once the number of copies output corresponds to the number of ports specified in the port vector FIFO 56, the frame pointer is forwarded to the reclaim queue 66. The reclaim queue 66 stores frame pointers that need to be reclaimed and walks the linked list chain to return the buffers to the free buffer queue 64 as free pointers. After being returned to the free buffer queue 64, the frame pointer is available for reuse by the MAC unit 20 or the gigabit MAC unit 24.

Figure 3:
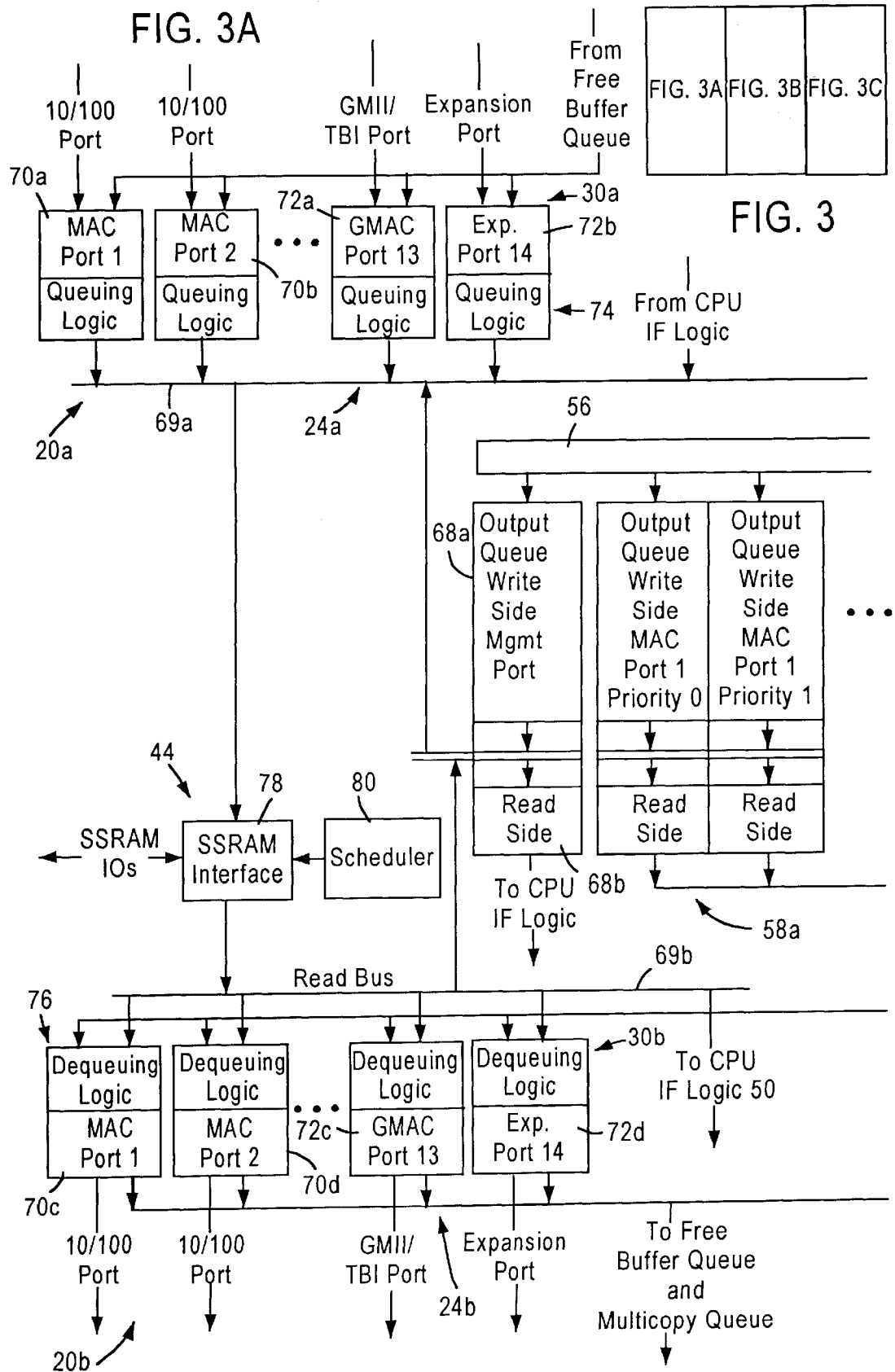
Figure 3B:
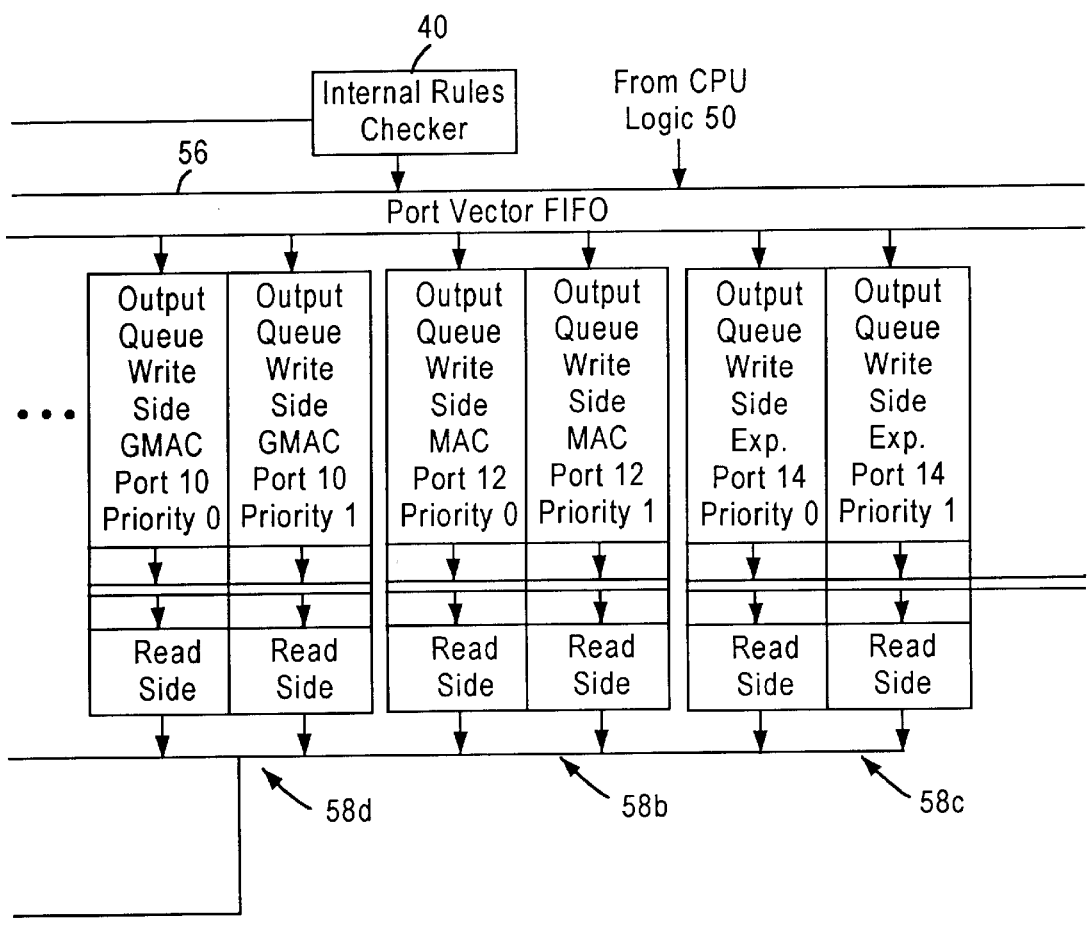
Figure 3C:
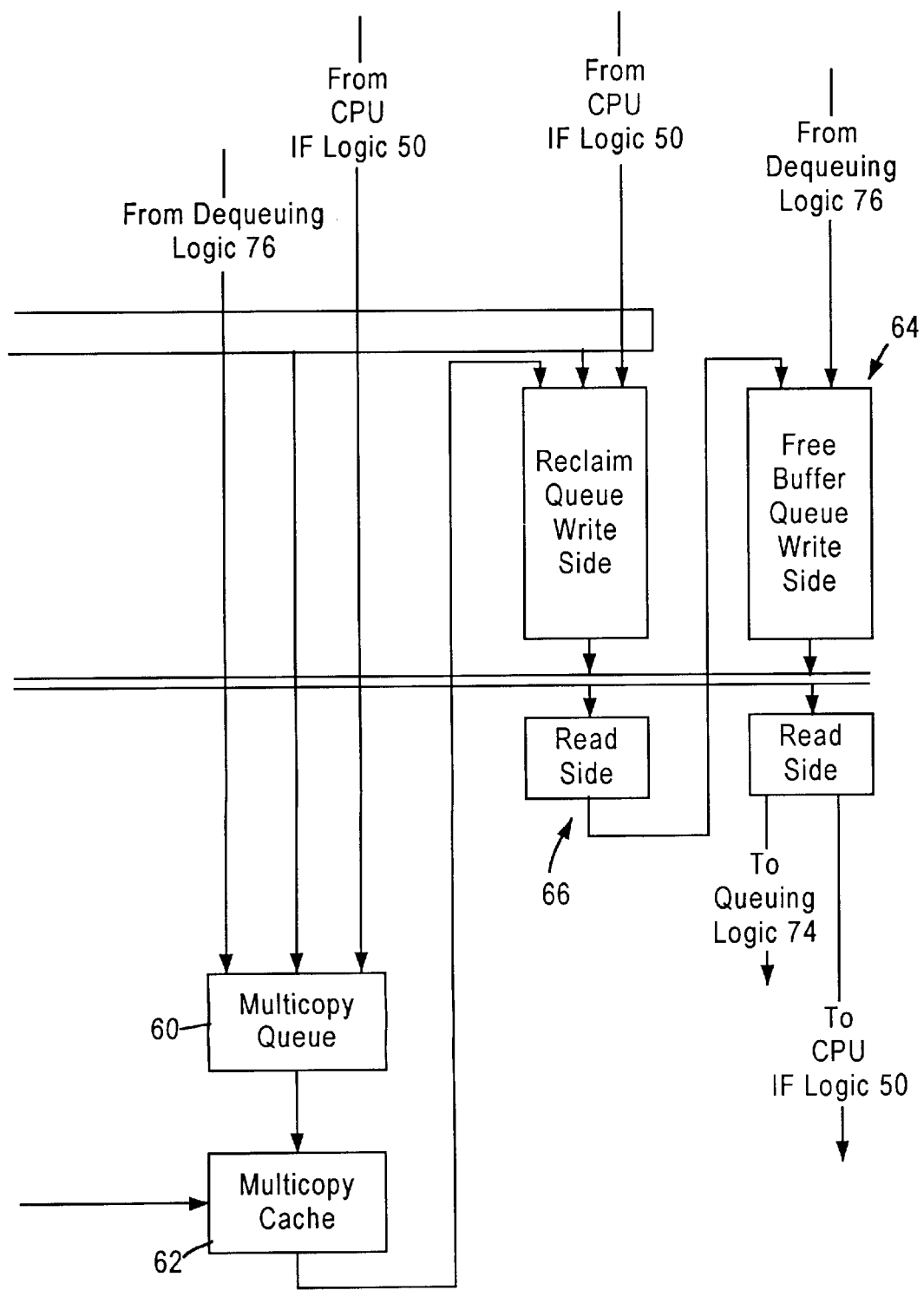

FIG. 3 depicts the switch subsystem 42 of FIG. 2 in more detail according to an exemplary embodiment of the present invention. Other elements of the multiport switch 12 of FIG. 2 are reproduced in FIG. 3 to illustrate the connections of the switch subsystem 42 to these other elements.

As shown in FIG. 3, the MAC module 20 includes a receive portion 20a and a transmit portion 24b. The receive portion 20a and the transmit portion 24b each include 12 MAC modules (only two of each shown and referenced by numerals 70a, 70b, 70c, and 70d) configured for performing the corresponding receive or transmit function according to IEEE 802.3 protocol. The MAC modules 70c and 70d perform the transmit MAC operations for the 10/100 Mb/s switch ports complementary to modules 70a and 70b, respectively.

The gigabit MAC port 24 also includes a receive portion 24a and a transmit portion 24b, while the expansion port 30 similarly includes a receive portion 30a and a transmit portion 30b. The gigabit MAC port 24 and the expansion port 30 also have receive MAC modules 72a and 72b optimized for the respective ports. The transmit portions 24b and 30b of the gigabit MAC port 24 and the expansion port 30a also have transmit MAC modules 72c and 72d, respectively. The MAC modules are configured for full-duplex operation on the corresponding port, and the gigabit MAC modules 72a and 72c are configured in accordance with the Gigabit Proposed Standard IEEE Draft P802.3z.

Each of the receive MAC modules 70a, 70b, 72a, and 72b include queuing logic 74 for transfer of received data from the corresponding internal receive FIFO to the external memory 36 and the rules checker 40. Each of the transmit MAC modules 70c, 70d, 72c, and 72d includes a dequeuing logic 76 for transferring data from the external memory 36 to the corresponding internal transmit FIFO, and a queuing logic 74 for fetching frame pointers from the free buffer queue 64. The queuing logic 74 uses the fetched frame pointers to store receive data to the external memory 36 via the external memory interface controller 44. The frame buffer pointer specifies the location in the external memory 36 where the received data frame will be stored by the receive FIFO.

The external memory interface 44 includes a scheduler 80 for controlling memory access by the queuing logic 74 or dequeuing logic 76 of any switch port to the external memory 36, and an SSRAM interface 78 for performing the read and write operations with the external memory 36. In particular, the multiport switch 12 is configured to operate as a non-blocking switch, where network data is received and output from the switch ports at the respective wire rates of 10, 100, or 1000 Mb/s. Hence, the scheduler 80 controls the access by different ports to optimize usage of the bandwidth of the external memory 36.

Each receive MAC stores a portion of a frame in an internal FIFO upon reception from the corresponding switch port; the size of the FIFO is sufficient to store the frame data that arrives between scheduler time slots. The corresponding queuing logic 74 obtains a frame pointer and sends a write request to the external memory interface 44. The scheduler 80 schedules the write request with other write requests from the queuing logic 74 or any read requests from the dequeuing logic 76, and generates a grant for the requesting queuing logic 74 (or the dequeuing logic 76) to initiate a transfer at the scheduled event (i.e., slot). Sixty-four bits of frame data is then transferred over a write data bus 69*a* from the receive FIFO to the external memory 36 in a direct memory access (DMA) transaction during the assigned slot. The frame data is stored in the location pointed to by the buffer pointer obtained from the free buffer pool 64, although a number of other buffers may be used to store data frames, as will be described.

The rules checker 40 also receives the frame pointer and the header information (including source address, destination address, VLAN tag information, etc.) by monitoring (i.e., snooping) the DMA write transfer on the write data bus 69*a*. The rules checker 40 uses the header information to make the forwarding decision and generate a forwarding instruction in the form of a forwarding descriptor that includes a port vector. The port vector has a bit set for each output port to which the frame should be forwarded. If the received frame is a unicopy frame, only one bit is set in the port vector generated by the rules checker 40. The single bit that is set in the port vector corresponds to a particular one of the ports.

The rules checker 40 outputs the forwarding descriptor including the port vector and the frame pointer into the port vector FIFO 56. The port vector is examined by the port vector FIFO 56 to determine which particular output queue should receive the associated frame pointer. The port vector FIFO 56 places the frame pointer into the top of the appropriate queue 58 and/or 68. This queues the transmission of the frame.

As shown in FIG. 3, each of the transmit MAC units 70*c*, 70*d*, 72*d*, and 72*c* has an associated output queue 58*a*, 58*b*, 58*c*, and 58*d*, respectively. In preferred embodiments, each of the output queues 58 has a high priority queue for high priority frames, and a low priority queue for low priority frames. The high priority frames are used for frames that require a guaranteed access latency, e.g., frames for multimedia applications or management MAC frames. The frame pointers stored in the FIFO-type output queues 58 are processed by the dequeuing logic 76 for the respective transmit MAC units. At some point in time, the frame pointer reaches the bottom of an output queue 58, for example, output queue 58*d* for the gigabit transmit MAC 72*c*. The dequeuing logic 76 for the transmit gigabit port 24*b* takes the frame pointer from the corresponding gigabit port output queue 58*d*, and issues a request to the scheduler 80 to read the frame data from the external memory 36 at the memory location specified by the frame pointer. The scheduler 80 schedules the request, and issues a grant for the dequeuing logic 76 of the transmit gigabit port 24*b* to initiate a DMA read. In response to the grant, the dequeuing logic 76 reads the frame data (along the read bus 69*b*) in a DMA transaction from the location in external memory 36 pointed to by the frame pointer, and stores the frame data in the internal transmit FIFO for transmission by the transmit gigabit MAC 72*c*. If the forwarding descriptor specifies a unicopy transmission, the frame pointer is returned to the free buffer queue 64 following writing the entire frame data into the transmit FIFO.

A multicopy transmission is similar to the unicopy transmission, except that the port vector has multiple bits set, designating the multiple ports from which the data frame will be transmitted. The frame pointer is placed into each of the appropriate output queues 58 and transmitted by the appropriate transmit MAC units 20*b*, 24*b*, and/or 30*b*.

The free buffer pool 64, the multicopy queue 60, the reclaim queue 66, and the multicopy cache 62 are used to manage use of frame pointers and re-use of frame pointers once the data frame has been transmitted to its designated output port(s). In particular, the dequeuing logic 76 passes frame pointers for unicopy frames to the free buffer queue 64 after the buffer contents have been copied to the appropriate transmit FIFO.

For multicopy frames, the port vector FIFO 56 supplies multiple copies of the same frame pointer to more than one output queue 58, each frame pointer having a unicopy bit set to zero. The port vector FIFO 56 also copies the frame pointer and the copy count to the multicopy queue 60. The multicopy queue 60 writes the copy count to the multicopy cache 62. The multicopy cache 62 is a random access memory having a single copy count for each buffer in external memory 36 (i.e., each frame pointer).

Once the dequeuing logic 76 retrieves the frame data for a particular output port based on a fetched frame pointer and stores the frame data in the transmit FIFO, the dequeuing logic 76 checks if the unicopy bit is set to 1. If the unicopy bit is set to 1, the frame pointer is returned to the free buffer queue 64. If the unicopy bit is set to zero indicating a multicopy frame pointer, the dequeuing logic 76 writes the frame pointer with a copy count of minus one (−1) to the multicopy queue 60. The multicopy queue 60 adds the copy count to the entry stored in the multicopy cache 62.

When the copy count in multicopy cache 62 for the frame pointer reaches zero, the frame pointer is passed to the reclaim queue 66. Since a plurality of frame pointers may be used to store a single data frame in multiple buffer memory locations, the frame pointers are referenced to each other to form a linked-list (i.e., chain) of frame pointers to identify the stored data frame in its entirety. The reclaim queue 66 traverses the chain of buffer locations identified by the frame pointers, and passes the frame pointers to the free buffer queue 64.

The foregoing description of the switch architecture provides an overview of the switch operations in a packet switched network. A more detailed description of the features of the present invention as embodied in the multiport switch 12 will now be provided. First, the architecture of an exemplary expansion port 30 will be discussed, followed by the details for transferring data between switches 12.

Embedding the Receive Port Number in the Port Vector

The present invention is directed to executing the source address (SA) lookups by the IRC 40 without having to store the receive (Rx) port number in the address table. This reduces the size of the address table, and therefore, the size of the chip. As described previously, the switch subsystem 42 provides the switching logic for receiving and forwarding frames to the appropriate output ports. The forwarding decisions, however, are made by the IRC 40 located on the switch 12.

Figure 4:
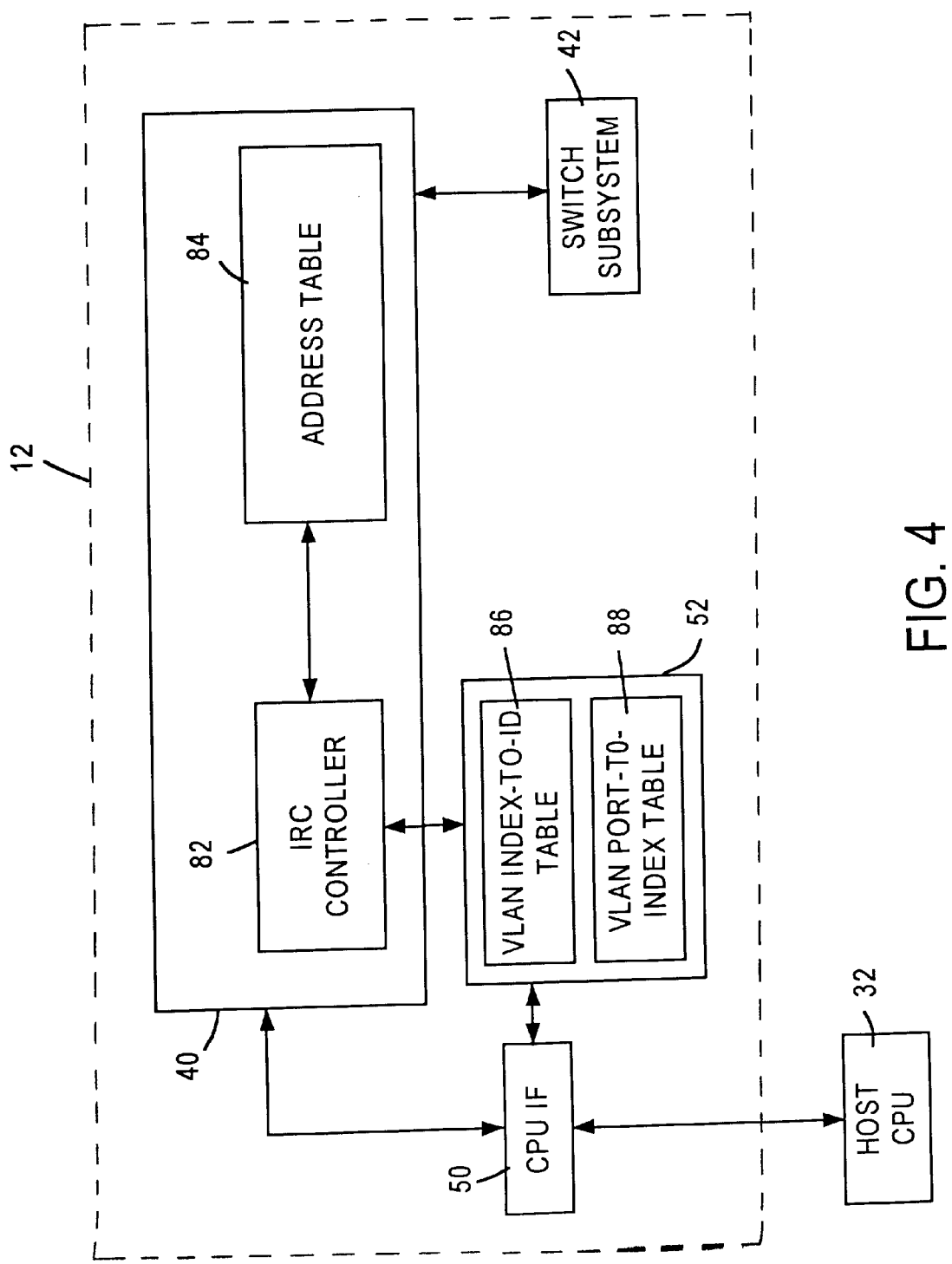
FIG. 4 is a block diagram of a system including the internal rules checker (IRC) of FIG. 2 in accordance with an embodiment of the present invention.

FIG. 4 illustrates the IRC 40, which includes an IRC controller 82 and address table 84, in communication with the switch subsystem 42. In the exemplary embodiment, the address table 84 is located within the IRC 40. Alternatively, the address table may be located outside the IRC 40 within another part of the switch 12 or even external to the switch 12. In the exemplary embodiment, the address table 84 supports 4096 user addresses and capabilities for 64 unique virtual local area networks (VLANs). However, the number of addresses and VLANs supported may be increased by expanding the table size.

VLANs provide "broadcast domains" whereby broadcast traffic is kept "inside" the VLAN. For example, a specific VLAN may contain a group of priority users. When sending data to this group of users, the data may include a specific VLAN identifier associated with this particular group to ensure that only these users receive the data. These VLAN groupings can be thought of as "sub-networks" within a larger network VLAN information is stored in the address table 84 along with the SA field.

FIG. 5 illustrates the organization of the IRC address table 84, which contains an array of 4096 entries. The first "n" entries 92 are referred to as "bin entries" and have addresses from "0" to "n−1". The remaining entries 94 are referred to as "heap entries" and have addresses from "n" to "4095". Each of the table entries includes a 76-bit address entry field and a 12-bit "next pointer" field. The IRC controller 82 performs updates to the address table 84 as part of the SA learning process, as will be discussed later.

Figure 6A:
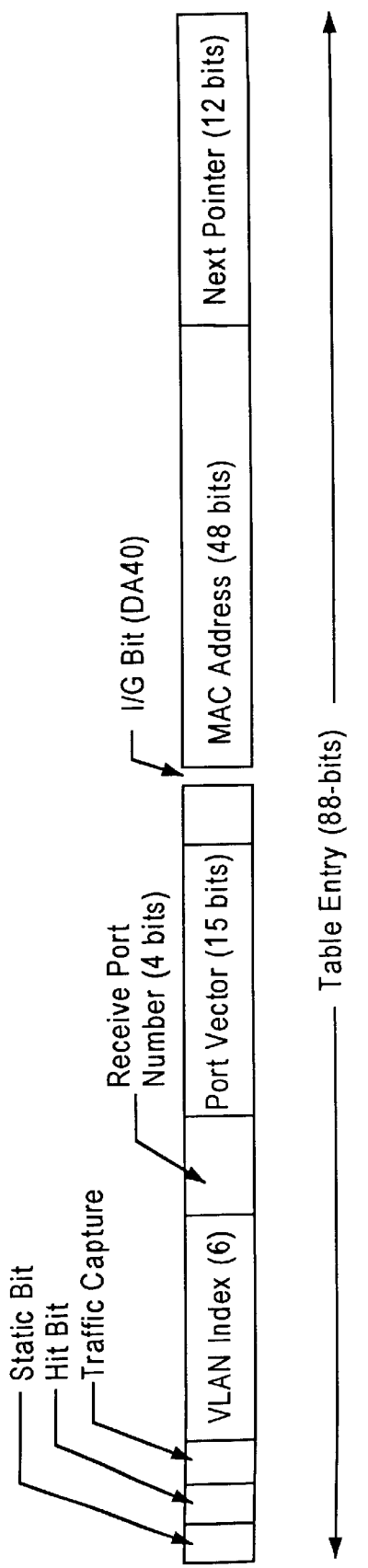
FIGS. 6A and 6B illustrate the formats of an exemplary IRC address table entry and an IRC address table in accord with an embodiment of the present invention.

FIG. 6A illustrates an exemplary composition of each 88-bit table entry shown in FIG. 5. The Hit Bit is used by the IRC controller 82 for address entry "aging" to delete entries from the address table 84. The Static Bit, also referred to as an aging override bit, is used to prevent deletion of an address entry. The traffic capture bit identifies traffic capture source and destination MAC addresses for mirroring MAC conversations to the management queue 68. The VLAN index field is a 6-bit field used to reference a 12-bit VLAN identifier (ID). A VLAN index-to-VLAN ID table 86, shown in FIG. 4, contains the mapping associations. The switch 12 receives both tagged and untagged frames. When the switch 12 receives untagged data frames, i.e., without VLAN tag information, the IRC 40 assigns a VLAN index from a VLAN port-to-index table 88, based on the receive port on which the frame is received. The VLAN index-to-ID table 86 and the VLAN port-to-index table 88 are located with the configuration and status registers 52 (as shown in FIG. 4). However, in alternative configurations, the tables 86 and 88 may be located within the IRC 40.

The receive port number field is a 4-bit field identifying the port on which the associated MAC address resides and, according to the present invention, need not be stored in the address table 84. The port vector is a 15-bit field that provides a forwarding descriptor with a vector identifying the ports to which the frame should be forwarded. The MAC address field is a 48-bit field that includes addresses for both source addresses and destination addresses. The addresses can be unicast, multicast or broadcast. An individual/group (I/G) bit is also included in the MAC address field. Under this exemplary format, all the fields discussed above are stored in the address table 84. Because 4096 table entries are required, a reduction in the number of fields that are required to be stored in the address table 84 translates into savings of memory space. The present invention eliminates the need to store the receive (RX) port number field.

Figure 6B:
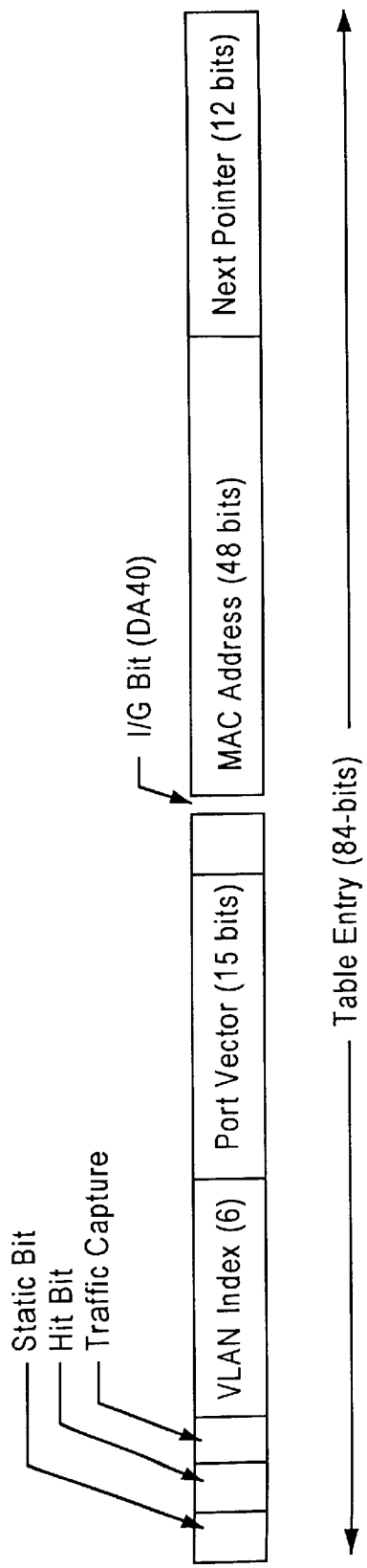

FIG. 6B shows the streamlined table entry in accord with the present invention, whereby the RX port number is removed. However, the receive port number information is captured within the port vector field. That is, the port vector field is set by the IRC controller 82 or the host CPU 32 such that the bit mask corresponds to the port that the frame is received. For example, if port 1 receives the frame, then the bit corresponding to port 1 is set. The other fields are retained. A discussion with respect to how this table entry is employed in the SA lookup process follows later.

In the exemplary embodiment of the present invention, shown in FIG. 4, the host CPU 32 functions as the management entity and is connected to the IRC 40 via the CPU interface (IF) 50. Alternatively, a management MAC may be connected to the CPU IF 50 to function as the management entity. The CPU IF 50 allows the host CPU 32, among other functions, to directly access the configuration and status registers 52 and permits communication between the IRC 40 and the host CPU 32.

The host CPU 32 is responsible for initializing the values in the address table 84. Upon power-up, the host CPU 32 loads values into the bin entries 92 based on the network configuration, including VLAN configurations. By contrast, the heap entries 94 are not fixed at power-up and are used for adding entries to the address table 84. The IRC 40 uses the specific fields of the address table 84 to make frame forwarding decisions when frames are received in the switch 12. More specifically, the IRC controller 82 includes control logic to search the address table 84 for frame forwarding information. From the information found in the address table 84, the IRC controller 82 creates a forwarding descriptor, which includes the frame pointer, the forwarding port vector, the receive port number, the VLAN ID, the priority class and a control opcode. The IRC controller 82 then transmits the forwarding port vector to the port vector FIFO 56 for queuing, as shown in FIG. 3.

To generate the forwarding decision, the IRC controller 82 performs a source address (SA)/VLAN index search and a destination address (DA)/VLAN index search. The (SA)/VLAN index search, in accord with the present invention, is discussed in greater detail with respect to FIG. 10. The switch 12 needs to make frame forwarding decisions relatively quickly, since multiple data frames may be received by the switch 12 simultaneously. Hence, a hashing scheme is used to search only a subset of the address entries, as described below. The memory structure of FIG. 5 provides an indexed arrangement, where a given network address will be assigned to a corresponding bin. In other words, each bin entry 96 is configured to reference a plurality of table entries (i.e., heap entries) 98. Hence, the IRC controller 82 performs a search of the address table 84 by first accessing a specific bin 96 pointed to by a hash key, and then searching the entries within (i.e., referenced by) the corresponding bin to locate the appropriate match. Each bin entry 96 is the starting point for the search by the IRC controller 82 for a particular address within the address table 84. A bin entry may reference no addresses (i.e., be empty), may reference only one address within the bin entry location, or may reference a plurality of addresses using a linked list chain structure.

Figure 7:
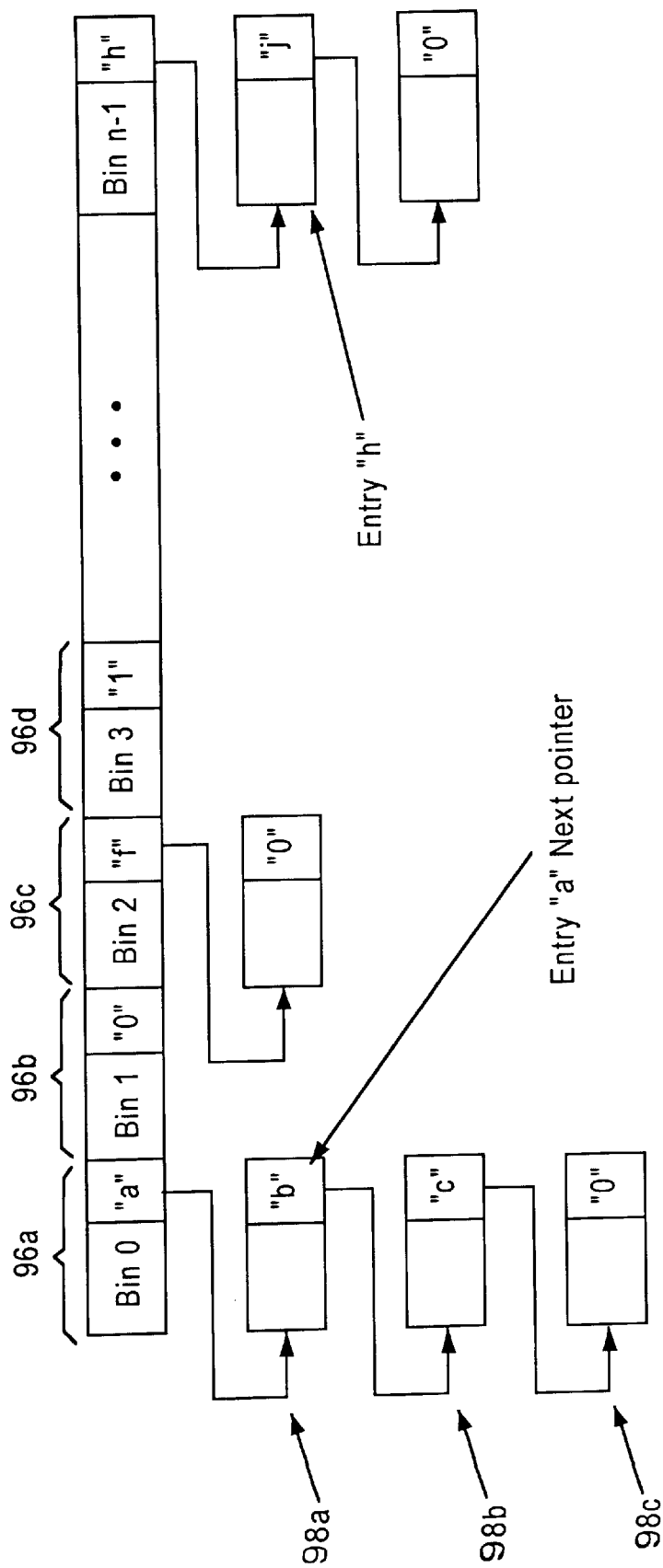
FIG. 7 illustrates linked list chains for identifying table entries relative to a selected bin.

FIG. 7 is a diagram illustrating bin entries referencing a different number of table entries. Each of the bin entries 96 and heap entries 98 includes the 76-bit address entry and a 12-bit "next pointer" field. The "next pointer" field associated with the bin entry 96 identifies the location of the next entry in the chain of linked list addresses. For example, Bin 3, 96d, of FIG. 7 does not have any associated table entries. In such a case, the 76-bit address entry equals zero (or another null value), and the bin's corresponding "next pointer" field will have a value of "1", indicating no entries for the corresponding bin. If a bin such as Bin 1, 96b, contains a single table entry, the bin entry will store the switching logic data for that single address in its address entry field, and store the value "zero" in the "next pointer" field, indicating there are no further address entries in the chain. Bin 0, 96a, however, references four addresses by using the "next pointer" field to identify the location of the next entry in the chain. The additional entries 96b–96d in the bin are linked in a linear list, as shown in FIG. 7. Thus, the first entry of Bin 0 is stored in the address entry field of the bin entry 96a and the next entry (heap entry 98a) is referenced by address entry "a" in the next pointer field of the bin entry 96a.

Figure 8:
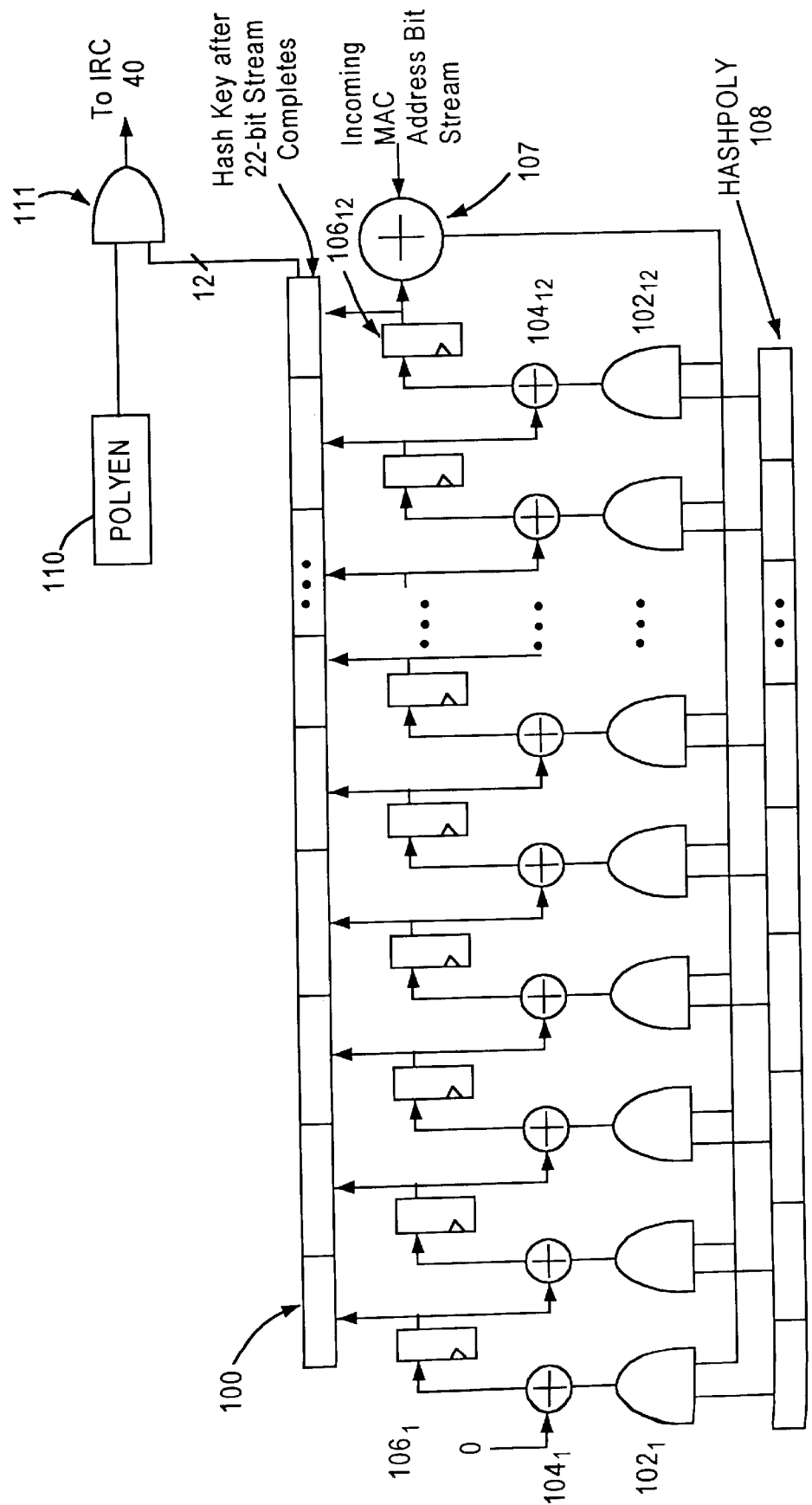
FIG. 8 illustrates a hash function circuit used with the IRC of FIG. 2.

FIG. 8 is a block diagram illustrating an exemplary hash function circuit 100 used in accordance with an embodiment of the present invention. The hash function circuit 100 includes a series of AND gates 102, a series of exclusive OR (XOR) gates 104, and a shift register 106. A user-specified hash function, stored in a user-programmable register (HASHPOLY) 108, includes a 12-bit value defining the hash polynomial used by the hash function circuit 100. Exemplary hash polynomials for the hashing function of the present invention are $x^{12}+x^7+x^4+x^3+1$, which has a HASHPOLY of 0000 1001 1001, and $x^{12}+x^6+x^4+x+1$, which has a HASHPOLY of 0000 0101 0011. The $x^{12}$ term is assumed to always equal "1", and therefore is not stored in the HASHPOLY register 108. Other polynomials may also be used for HASHPOLY based on the particular design requirements.

The hash function circuit 100 generates the hash key using the source address of the data packet according to a user-specified hash functions. Initially, the IRC controller 82 concatenates the 16 least significant bits of the source address of the data packet with the VLAN index to create a search key. Next, the hash function circuit 100 XORs, via XOR 107, the search key with the output of the register $106_{12}$.

The hash function circuit 100 ANDs, via AND gates 102, the output of XOR 107 bitwise with HASHPOLY. The hash function circuit 100 then XORs the output of AND gates 102 with the output of register 106. After the entire search key has been processed, the hash function circuit 100 outputs a 12-bit hash key.

From the 12-bit hash key, the IRC controller 82 calculates a bin number for searching the appropriate bin list in address table 86. More particularly, the IRC 40 uses the lower POLYEN bits of the hash key to generate the bin number. The bin number falls in the range of [0, n−1] where $n=2^{POLYEN}$ and the value of POLYEN is programmed by the host CPU 32 and stored in register 110. The hash key output by the hash function circuit 100 is output to a logic circuit, for example a 12-bit parallel AND gate 111, that selectively outputs the lower significant bits of the hash key based upon a polynomial enable value (POLYEN) stored in register 110. The field "POLYEN" defines how many bits of the hash key are used to create the bin number. For example, if POLYEN= 5, then the IRC 40 uses the lower five bits of the hash key. Hence, the hash key output by the logic circuit 100 is based upon masking the 12-bit hash key using the stored register value POLYEN in register 110.

After the bin number is calculated, the IRC controller 82 searches the bin list of the particular bin for an address entry whose address, VLAN index and receive port number fields match the source address (SA), and VLAN index of the received frame, as described later.

Figure 9:
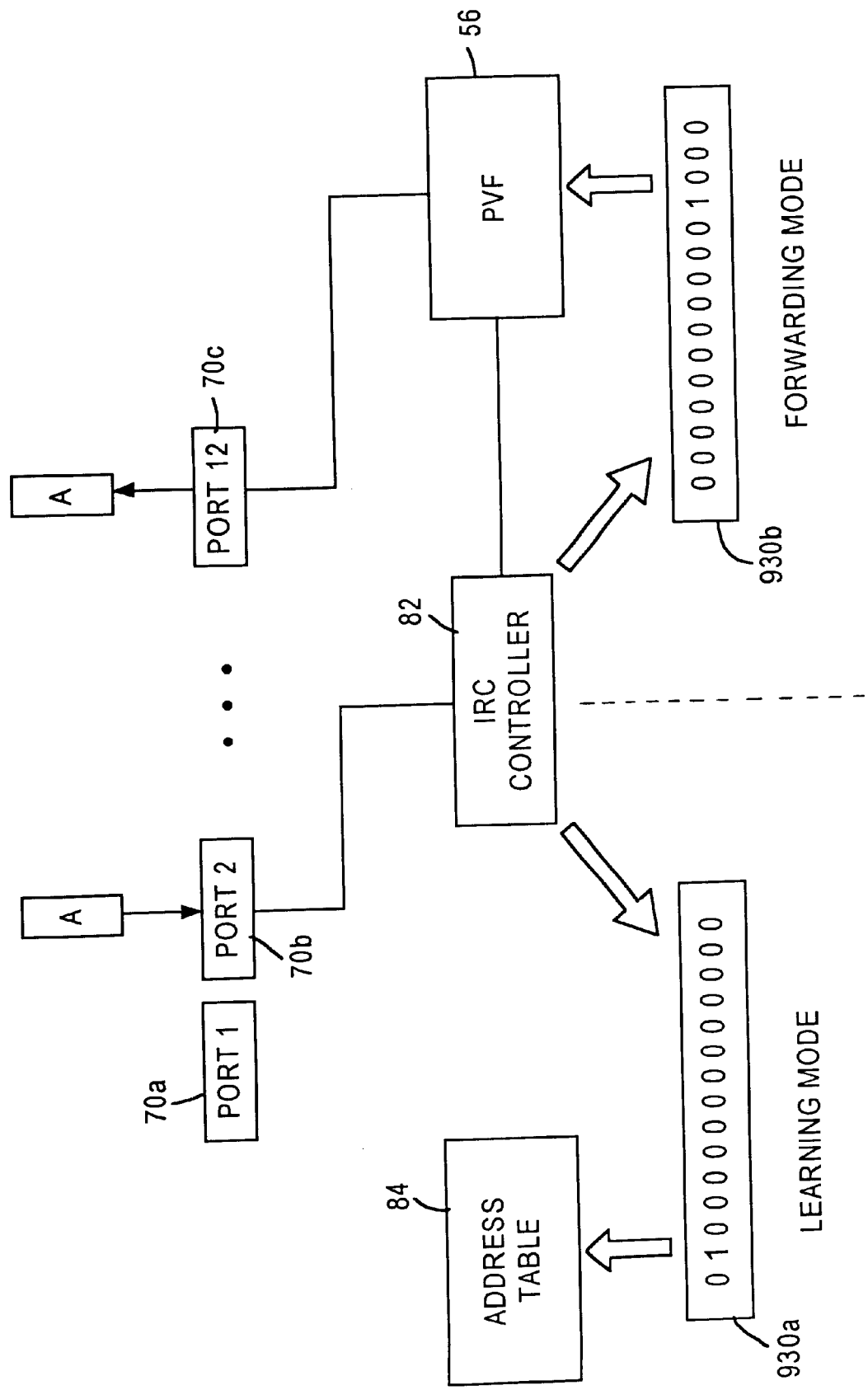
FIG. 9 illustrates the manipulation of the port vector field in accord with an embodiment of the present invention.

FIG. 9 shows the manner in which the receive port number is "embedded" into the port vector field. The figure provides an example involving ports 1 through 12 (70a, 70b, 70c). For the purposes of explanation, a data frame A is received by port 2 70b and is transmitted out port 12 70c. When the data frame is received by port 2, the IRC controller 82 determines the source address of data frame A in a learning mode, as shown. The IRC controller 82, in the learning mode, outputs a port vector 930a that reflects the fact that data frame A was received by port 2 70b. That is, the IRC controller 82 produces a mask with the bit corresponding to port 2 70b set; e.g., 0100000000000000 (930a). This port vector 930a, in turn, is stored by the IRC controller 82 in the address table 84 as part of the SA lookup process (discussed below with respect to FIG. 10). Use of the port vector 930a is distinct and separate from the use of the port vector 930b in the forwarding mode.

In the forwarding mode, the IRC controller 82 creates a forwarding descriptor that contains a port vector that reflects the ports which the data frame A should be transmitted out. In this example, the data frame A is to be forwarded out of port 12 70c. Thus, the IRC controller 82 outputs the port vector 930b, which has the bit corresponding to port 12 set—i.e., 000000000001000, to the PVF 56. By utilizing the port vector field differently depending on the mode, learning or forwarding, the receive port number can be embedded in the port vector field. As a result, the receive port number need not be stored in the address table 84 to effect the SA lookup process.

Figure 10:
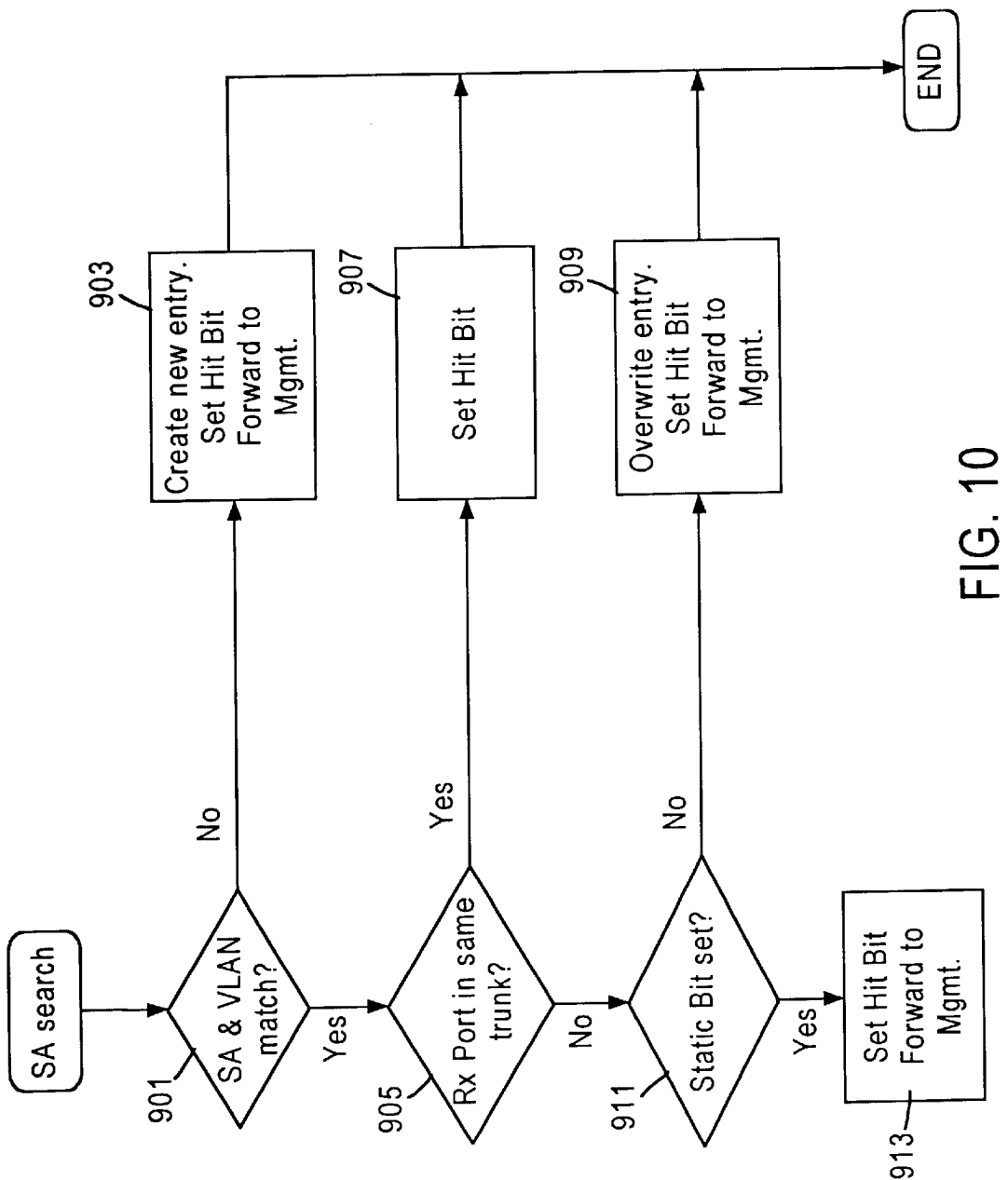
FIG. 10 is a flow diagram illustrating the operation of the IRC of FIG. 2 for the source address (SA) lookup process according to an embodiment of the present invention.

FIG. 10 illustrates a flow diagram of the SA lookup that utilizes the address table entry of FIG. 6B, in accord with the present invention. The purpose of the SA lookup routine is to "learn" the MAC address of the receive frame. The SA lookup is performed after the receive frame is assigned a VLAN classification. In step 901, the IRC controller 82 checks whether the source address and the VLAN index of the receive frame header matches the entries in the address table 84. If there is not a match (step 903), a new table entry is written into the address table; the table entry would follow the format of the streamlined table entry of FIG. 6B. In addition, the Hit Bit is set for that entry by the IRC controller 82, and the receive frame header is forwarded to the management port. If, however, the IRC controller 82 finds a match, it inquires, per step 905, whether the Rx port points to a port that is in the same trunk as the frame's Rx port. Because the Rx port information is derived from the port vector field, this information is not stored in the address table 84. That is, IRC controller 82 embeds the Rx port number information within the port vector field, in which the bit mask of the port vector (for the purposes of learning) indicates the port on which the frame was received. As a result, the size of the address table 84 is advantageously minimized. The Hit Bit, in step 907, is set by the IRC controller 82. Otherwise, if the Rx port is not in the same trunk, the IRC controller 82, in step 911, examines the Static Bit to determine if it has been set. In the case where the Static Bit has not been set, the IRC controller 82, in step 909, overwrites the table entry in the address table 84 with the new table entry and sets the Hit Bit. Furthermore, the IRC controller 82 forwards the frame header to the management port (not shown). Lastly, if the IRC controller finds the Static Bit set, it sets, in step 913, the Hit Bit and forwards the frame header to the management port. It should be noted that during this process of SA lookup, the Rx port number is never stored in the address table 84. If the IRC controller 82 finds an address entry whose address and VLAN index match the SA and VLAN index of the frame and whose Rx port field matches or corresponds to a port that is in the same "trunk" (i.e., a set of ports predefined by the user) as the frame's Rx port, the IRC controller 82 sets the Hit Bit for that address entry. The above learning process enables the IRC 40 to properly forward the data frames within the multiport switch 12.

According to the disclosed embodiments, a system and method for performing a SA lookup uses a table entry format that includes a number of fields that are required for the IRC 40 to make forwarding decisions. Although the SA lookup process utilizes Rx port number, the Rx port number is never stored in the address table 84. This information is embedded in the port vector field by the IRC controller 82, in which the bit mask corresponds to the receive port (and accordingly, the Rx port number). As discussed previously, the address table 84 contains a finite number of address entries due to limited space on the switch 12. Therefore, the IRC controller 82 provides a method of performing the SA lookup to learn MAC addresses without the need to store the Rx port field, resulting in a minimal address table 84 size. A key advantage of the present invention is that the number of fields necessary for the storage of addressing information in the network address table is reduced, enabling a corresponding physical reduction in size of the integrated circuit chip that implements the multiport switch.

While this invention has been described in connection with what is presently considered to be the most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. A multiport switch configured for controlling communication of data frames, comprising:
   a plurality of ports for receiving and transmitting the data frames;
   an address table for storing address information including source addresses and port vectors associated with the data frames; and
   an internal decision making engine, coupled to the plurality of ports, accessing the address table and configured to learn the source addresses of the data frames and to store corresponding port vectors, each of the port vectors identifying, in a learning mode, one of the ports that received the data frame and, in a forwarding mode, identifying which of the ports are to transmit the data frame, wherein the address table comprises a plurality of table entries, each of the entries having a format comprising:
   a static bit for preventing deletion of the table entries;
   a hit bit for aging the entries;
   an address field indicating a source address of the data frames;
   a virtual local area network (VLAN) field; and
   a port vector field identifying the ports to which each received data frame should be forwarded for transmission from the multiport switch, the port vector field having embedded therein a port receive number that indicates the one port that received said each data frame.

2. The multiport switch of claim 1, wherein the source address is a Medium Access Control (MAC) address.

3. The multiport switch of claim 1, wherein the address table represents a plurality of bins of address entries.

4. The multiport switch of claim 3, further comprising a hash key generator configured to receive source addresses and to generate a corresponding hash key that is used by the internal decision making engine.

5. A multiport switch configured for controlling communication of data frames, comprising:
   a plurality of ports for receiving and transmitting the data frames;
   an address table for storing address information including source addresses and port vectors associated with the data frames; and
   an internal decision making engine, coupled to the plurality of ports, accessing the address table and configured to learn the source addresses of the data frames and to store corresponding port vectors, each of the port vectors identifying, in a learning mode, one of the ports that received the data frame and, in a forwarding mode, identifying which of the ports are to transmit the data frame, wherein
   the address table comprises a plurality of table entries, each of the entries having a format comprising:
   a static bit for preventing deletion of the table entries;
   a hit bit for aging the entries;
   an address field indicating a source address of the data frames;
   a virtual local area network (VLAN) field; and
   a port vector field representing an embedded port receive number that indicates the one port that received the data frame,
   the internal decision making engine is configured to learn the source addresses of the plurality of data frames by:
   accessing a frame header associated with a received one of the data frames;
   comparing the frame header having an address field and a VLAN field with the corresponding fields of the table entries to determine a match or a non-match;
   creating a new one of the table entries, setting a hit bit of the new table entry, and forwarding the corresponding frame header to one of the ports that is designated as a management port based upon the non-match of the address field and the non-match of the VLAN field;
   decoding, in response to the match of the address field and the match of the VLAN field, a receive port number from the port vector field of each of the table entries and determining whether the decoded receive port number is in a same trunk as a receive port number of the frame header, wherein the internal decision making engine sets the hit bit based upon the determination that the decoded receive port number is in a same trunk as the receive port number of the frame header; and
   determining, in response to the match of the address field and the match of the VLAN field and the finding that the decoded receive port number is not in the same trunk as the receive port number of the frame header, whether the table entry has its static bit field set, wherein the internal decision making engine overwrites the table entry with the frame header information, sets a corresponding hit bit, and forwards the frame header to the management port based upon a non-setting of the static bit field; and
   the internal decision making engine sets the corresponding hit bit and forwards the frame header to the management port based upon the match of the corresponding address field, the match of the corresponding VLAN field, the determination that the corresponding decoded receive port number is not in the same trunk as the receive port number of the frame header, and the setting of the static bit field.

6. A method of learning source addresses of data frames received by a multiport switch comprising:

receiving a frame header associated with one of the data frames, the frame header comprising a source address;

assigning a virtual local area network (VLAN) identifier to the received data frames; and learning via an internal decision making engine the source addresses of the data frames by manipulating an address table having a plurality of table entries and creating corresponding port vectors, each of the port vectors indicating the port that received the data frame, wherein the step of learning updates the address table, each of the table entries having a format comprising:

a static bit for preventing deletion of the table entries;

a hit bit for aging the entries;

an address field indicating a source address of the data frames;

a virtual local area network (VLAN) field; and a port vector field identifying the ports to which each received data frame should be forwarded for transmission from the multiport switch, the port vector field having embedded therein a port receive number that indicates the one port that received said each data frame.

7. The method of claim 6, wherein the step of learning utilizes a source address that is a Medium Access Control (MAC) address.

8. The method of claim 6, wherein the step of learning has the address table representing a plurality of bins of address entries.

9. The method of claim 6, wherein the step of learning utilizes a hash key generator configured to receive source addresses and to generate a corresponding hash key that is used by the internal decision making engine.

10. A method of learning source addresses of data frames received by a multiport switch comprising:

receiving a frame header associated with one of the data frames, the frame header comprising a source address;

assigning a virtual local area network (VLAN) identifier to the received data frames; and learning via an internal decision making engine the source addresses of the data frames by manipulating an address table having a plurality of table entries and creating corresponding port vectors, each of the port vectors indicating the port that received the data frame, wherein the step of learning updates the address table, each of the table entries having a format comprising:

a static bit for preventing deletion of the table entries;

a hit bit for aging the entries;

an address field indicating a source address of the data frames;

a virtual local area network (VLAN) field; and a port vector field representing an embedded port receive number that indicates the one port that received the data frame, and the step of learning comprises:

comparing the frame header having an address field and a VLAN field with the corresponding fields of the table entries to determine a match or a non-match;

creating a new one of the table entries, setting a hit bit of the new table entry, and forwarding the corresponding frame header to one of the ports that is designated as a management port based upon the non-match of the address field and the non-match of the VLAN field;

decoding, in response to the match of the address field and the match of the VLAN field, a receive port number from the port vector field of each of the table entries and determining whether the decoded receive port number is in a same trunk as a receive port number of the frame header, wherein the internal decision making engine sets the hit bit based upon the determination that the decoded receive port number is in a same trunk as the receive port number of the frame header;

determining, in response to the match of the address field and the match of the VLAN field and the finding that the decoded receive port number is not in the same trunk as the receive port number of the frame header, whether the table entry has its static bit field set, wherein the internal decision making engine overwrites the table entry with the frame header information, sets a corresponding hit bit, and forwards the frame header to the management port based upon a non-setting of the static bit field; and setting, in response to the match of the address field and the match of the VLAN field and the finding that the decoded receive port number is not in the same trunk as the receive port number of the frame header and a setting of the static bit field, the corresponding hit bit and forwarding the frame header to the management port based upon the match of the corresponding address field, the match of the corresponding VLAN field, the determination that the corresponding decoded receive port number is not in the same trunk as the receive port number of the frame header, and the setting of the static bit field.

11. A multiport switch configured for controlling communication of data frames, comprising:

a plurality of ports for receiving and transmitting the data frames; and an internal decision making engine coupled to the plurality of ports comprising:

an internal rules checker controller configured to learn the source addresses of the data frames and to store corresponding port vectors, each of the port vectors indicating, in a learning mode, the port that received the data frame and, in a forwarding mode, indicating which of the ports are to transmit the data frame; and an address table for storing address information including source addresses and the port vectors, wherein the address table comprises a plurality of table entries, each of the entries has a format comprising:

a static bit for preventing deletion of the table entries;

a hit bit for aging the entries;

an address field indicating a source address of the data frames;

a virtual local area network (VLAN) field; and a port vector field identifying the ports to which each received data frame should be forwarded for transmission from the multiport switch, the port vector field having embedded therein a port receive number that indicates the one port that received said each data frame.

12. The multiport switch of claim 11, wherein the source addresses are Medium Access Control (MAC) addresses.

13. The multiport switch of claim 11, wherein the address table represents a plurality of bins of address entries.

14. The multiport switch of claim 13, further comprising a hash key generator configured to receive source addresses and to generate a corresponding hash key that is used by the internal decision making engine.

15. A multiport switch configured for controlling communication of data frames, comprising:

a plurality of ports for receiving and transmitting the data frames; and an internal decision making engine coupled to the plurality of ports comprising:

an internal rules checker controller configured to learn the source addresses of the data frames and to store corresponding port vectors, each of the port vectors indicating, in a learning mode, the port that received the data frame and, in a forwarding mode, indicating which of the ports are to transmit the data frame; and an address table for storing address information including source addresses and the port vectors, wherein the address table comprises a plurality of table entries, each of the entries has a format comprising:

a static bit for preventing deletion of the table entries;

a hit bit for aging the entries;

an address field indicating a source address of the data frames;

a virtual local area network (VLAN) field; and a port vector field having an embedded port receive number that indicates the one port corresponding to the data frames, the internal decision making engine is configured to learn the source addresses of the plurality of data frames by:

accessing a frame header associated with a received one of the data frames;

comparing the frame header having an address field and a VLAN field with the corresponding fields of the table entries to determine a match or a non-match;

creating a new one of the table entries, setting a hit bit of the new table entry, and forwarding the corresponding frame header to one of the ports that is designated as a management port based upon the non-match of the address field and the non-match of the VLAN field;

decoding, in response to the match of the address field and the match of the VLAN field, a receive port number from the port vector field of each of the table entries and determining whether the decoded receive port number is in a same trunk as a receive port number of the frame header, wherein the internal decision making engine sets the hit bit based upon the determination that the decoded receive port number is in a same trunk as the receive port number of the frame header; and determining, in response to the match of the address field and the match of the VLAN field and the finding that the decoded receive port number is not in the same trunk as the receive port number of the frame header, whether the table entry has its static bit field set, wherein the internal decision making engine overwrites the table entry with the frame header information, sets a corresponding hit bit, and forwards the frame header to the management port based upon a non-setting of the static bit field, and the internal decision making engine sets the corresponding hit bit and forwards the frame header to the management port based upon the match of the corresponding address field and the match of the corresponding VLAN field, and the determination that the corresponding decoded receive port number is not in the same trunk as the receive port number of the frame header, and the setting of the static bit field.

* * * * *